S. POOLE.
Meat-Holder.

No. 7,995. Reissued Dec. 18, 1877

Witnesses
Chas H. Smith
Harold Serrell

Inventor
Samuel Poole
per Lemuel W. Serrell
Atty

N. PETERS, PHOTO-LITHOGRAPHER, WASHINGTON, D. C.

UNITED STATES PATENT OFFICE.

SAMUEL POOLE, OF BROOKLYN, NEW YORK.

IMPROVEMENT IN MEAT-HOLDERS.

Specification forming part of Letters Patent No. 191,367, dated May 29, 1877; Reissue No. 7,995, dated December 18, 1877; application filed July 18, 1877.

*To all whom it may concern:*

Be it known that I, SAMUEL POOLE, of Brooklyn, in the county of Kings and State of New York, have invented an Improvement in Holders for Meat and other material, of which the following is a specification:

Holders for bread and other articles have been made of two frames on lever-handles, and gridirons have been made as frames, hinged together at the edges opposite to the handles.

My present invention is made for holding meat and other materials, and is adapted to culinary purposes, such as handling pieces of meat, lifting the same out of a pot or a brine-barrel, or for turning meat in a pan while cooking, or for holding meat or other material while being cooked or broiled.

I make use of prongs or frames, one of which is upon a shank or bar that extends to the handle, and the other is hinged near the edge that is toward the handle, and receives its motion from a longitudinally-moving bar or rod operated at the distant end, so that the grasping device can be more or less remote from the handle, according to the length of the intervening parts, thereby rendering the instrument adapted to use under circumstances where the devices heretofore employed were not available.

Figure 1:
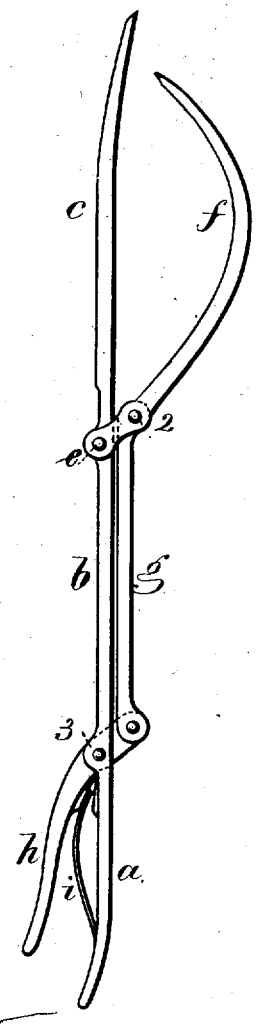
Figure 2:
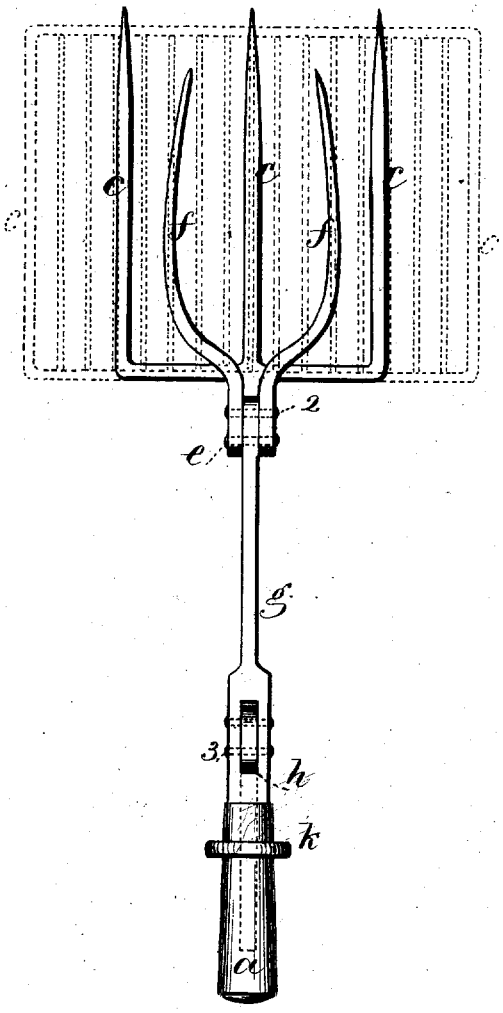

In the drawing, Figure 1 is an edgewise view of the holder, and Fig. 2 is an elevation at right angles to Fig. 1.

The handle *a* and shank or bar *b* are either connected together or formed as one piece. At the outer end of the shank or bar *b* are the prongs or tines *c*, (shown by full lines in Fig. 2;) or a frame of bars is employed, as shown by the dotted lines.

The other portion of the holder is composed of the prongs *f*, or a frame of bars, as represented by the dotted lines, Fig. 2. In either case the parts are hinged together at or near the edges of the holder nearest the handle *a*, as shown at *e*, thereby allowing the prongs or frames to be opened or closed.

The actuating device is a rod, *g*, that is longitudinal to the bar or shank *b*, and by its end movement opens or closes the holder. The outer end of this bar *g* is represented as pivoted to the swinging fork or holder at 2, and the end nearest the handle as pivoted to the lever *h*, the fulcrum of which is at 3, and the spring at *i* serves to open the handle and move the holder. By this construction the meat fork or holder can be easily operated at the handle end, regardless of the length of the shank or bar *b* and bar *g*, and when the article has been grasped by the holder, a ring, *k*, Fig. 2, may be slipped back upon the lever *h* and handle *a*, to hold them together.

This fork or holder is very convenient for cooks, butchers, and others, because the same can be operated easily, regardless of the distance the holder is from the handle, and with the fork the tines are to be pointed, so as to be thrust into the meat, and the holders *f* grasp the same in addition.

I claim as my invention—

1. A holder for meat and other articles of food, consisting of two open frames, *c f*, hinged together at *e*, and provided with the handle *a*, bar *b*, actuating-lever *h*, and connecting-rod *g*, substantially as and for the purposes set forth.

2. In combination with the pointed penetrating-prongs *c f*, hinged together in the manner described, the longitudinally-acting rod *g*, handles *a h*, and spring *i*, substantially as set forth.

3. In combination with the pointed prongs *c*, the swinging pointed prongs *f*, bent toward the prongs *c*, and united by the hinge *e*, substantially as set forth.

4. The combination, with the penetrating-prongs *c* and swinging curved prongs *f*, of the uniting-hinge *e*, bars *b* and *g*, and handle, substantially as set forth.

Signed by me this 14th day of July, A. D. 1877.

SAMUEL POOLE.

Witnesses:

GEO. T. PINCKNEY,

HAROLD SERRELL.